June 5, 1934.  H. W. ROBINSON  1,961,571
LID FOR COOKING VESSELS
Filed Sept. 10, 1931
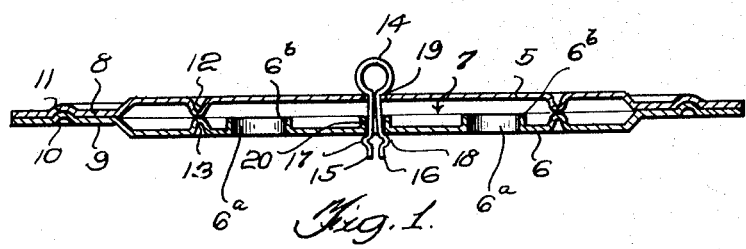
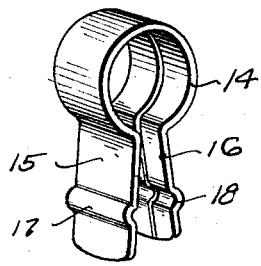
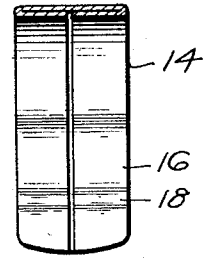
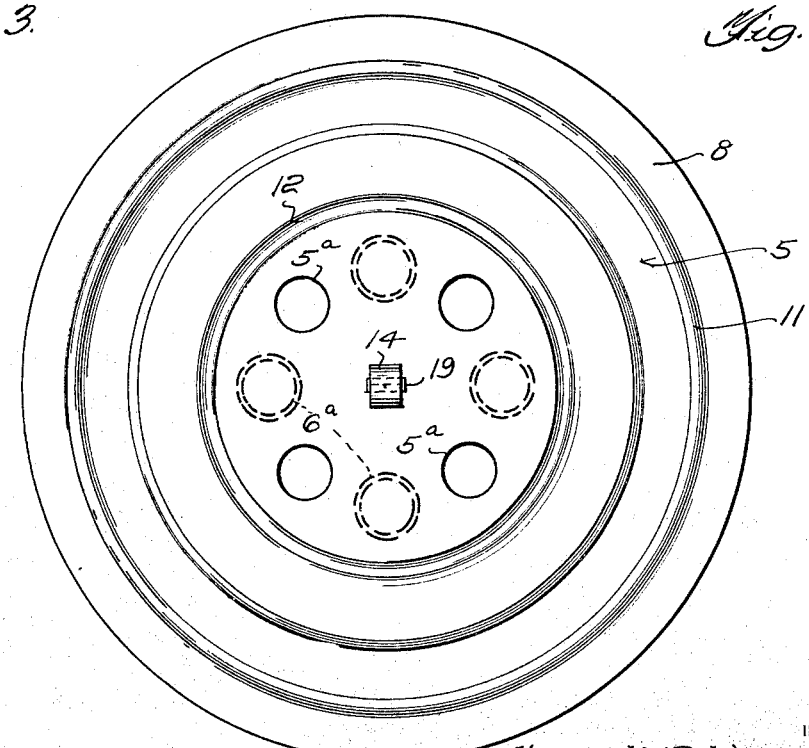
INVENTOR
Howard W. Robinson,
BY Samuel Herrick,
ATTORNEY Patented June 5, 1934

1,961,571

UNITED STATES PATENT OFFICE 1,961,571

LID FOR COOKING VESSELS

Howard W. Robinson, Twin Falls, Idaho

Application September 10, 1931, Serial No. 562,166

6 Claims. (Cl. 53—8)

This invention relates to an assembly constituting a cover for cooking vessels. The device is of the general character of that shown in my copending application Serial No. 482,565, filed September 17, 1930, and like the device of that application comprises a pair of spaced plates 5 and 6 with non-registering openings formed through them by which condensation from the steam and greases are trapped and returned to the cooking vessel. This general thought constitutes no part of the present invention, having been disclosed in my application aforesaid.

The present invention relates more particularly to a new and improved way of assembling the plates and holding them in properly spaced relation to each other.

The invention further contemplates the provision of a handle structure which performs the double function of providing a lifting handle and of tying the plates together.

Further objects and advantages of the invention will be set forth in the detailed description which follows:

In the accompanying drawing

Figure 1 is a sectional view of a pair of opposed plates with the improved handle element in place.

Fig. 2 is a plan view of a cover constructed in accordance with the invention.

Figure 3 is a perspective view of the handle and

Figure 4 is a lateral sectional view through the handle.

Like numerals designate corresponding parts in all the figures of the drawing.

In the drawing, the numerals 5 and 6 designate spaced plates so shaped as to form a chamber 7 between them. Any suitable way may be employed for holding the body portions of the plates in spaced relation to each other. In the present instance, I have shown offset rim portions 8 and 9 upon the respective plates which lie in contact with each other and hold the body portions in spaced relation.

An upstanding rib 10 on the lower plate fits a corresponding groove 11 upon the upper plate and holds the plates against lateral shifting with respect to each other. The plates may or may not comprise the abutting annular ribs 12 and 13 since, as stated, the present invention does not relate to the particular form of the plates but to the means for holding the plates in assembled relation. To the latter end, I provide a combined handle and connecting member, shown in Figure 3, which comprises the substantially circular finger receiving portion 14 and the depending and opposed straight portions 15 and 16, the latter being provided with outwardly projecting ribs 17 and 18.

The plates 5 and 6 are provided with slots 19 and 20 and when the handle and connector member of Figure 2 is thrust through these slots, the ribs 17 and 18 lie beneath the lower plate, while the member 14 lies above the upper plate. Since the elasticity of the member 14 is such as to cause the legs 15 and 16 to tend to spring away from each other, the ribs 17 and 18 will be held locked beneath the lower plate and thus, since the plates can not separate directly away from each other, and since said plates are held against lateral shifting by the ribs 10 and grooves 11, it follows that by the simple expedient of putting the handle member in place, the plates are locked against separation in a very economical and efficient way.

Any suitable way may be resorted to of forming the handle and connector element of Fig. 2. I prefer to make it of stamped sheet metal folded upon itself at its opposite edges, as indicated at 19 in Fig. 3.

Like the cover of my copending application the plates 5 and 6 are provided with non-aligning openings; the openings of the plate 5 being indicated at 5a in Fig. 2 and the openings of the plate 6 being indicated in dotted lines at 6a in the same figure. Those portions of the plates which lie outwardly of the openings may be utilized to collect and retain greases, gravies, liquids, etc., and if desired upstanding rims 6b may be formed about the lower openings 6a.

From the foregoing description, it will be seen that the means provided to accomplish the desired results are of an exceedingly simple and economical nature. However, it is to be understood that the invention is not limited to the precise construction set forth, but that it includes within its purview whatever changes come within either the terms or the spirit of the appended claims.

Having described my invention, what I claim is:

1. A cover for cooking vessels of the character described comprising a pair of plates, the body portions of which have non-aligning openings formed therein, said plates being provided with confronting and contacting rim portions by which said body portions are held in spaced relation, means carried by said rim portions for holding the plates against lateral shifting with respect to each other, and a handle element comprising a resilient finger grasp portion and a laterally separable and resilient portion adapted to traverse both of said plates and to engage beneath the lowermost of said plates under its resilient action.

2. A cover for cooking vessels comprising a pair of spaced plates of substantially co-equal area provided with staggered openings forming a condensation chamber between them and engaged with each other about their outer edges, and a resilient handle traversing both of said plates and laterally expansible at its inner end for engagement with the lowermost of said plates to attach said plates together during use and to permit their ready separation when required.

3. A structure as recited in claim 2 in combination with interengaging elements carried by said plates and resisting lateral shifting of the plates with respect to each other.

4. An assembly of the character described comprising a pair of relatively flat plates spaced from each other and comprising contacting portions holding said plates in spaced relation and forming a condensation chamber between said plates, said plates being provided with openings permitting the passage of steam to and out of the space between said plates, and a handle element comprising a hand grasp portion and a pair of laterally yieldable resilient legs, the innermost of said plates being provided with an opening through which said legs pass, said legs having ribs projecting in opposite directions, the distance between the ribs and the head being equal to the distance between the outer surfaces of said plates when said plates are brought together, whereby when said legs spring apart said ribs and head tie said plates together in contacting relation.

5. A device of the character described comprising a pair of relatively flat spaced plates contacting with each other around their outer portions to form a condensation chamber between said plates, and a handle element comprising a resilient hand grasp portion and a pair of laterally yieldable legs having transverse ribs thereon, said plates being provided with openings for the passage of said legs and said ribs engaging beneath the lowermost of said plates under the lateral action of said legs as and for the purposes set forth.

6. A device of the character described comprising a pair of relatively spaced flat plates forming a condensation chamber between them and comprising engaging portions around their outer edges, said plates being provided with aligned openings for the reception of a handle element, and a handle element traversing said central opening of the plates and directly engaging said upper and lower plates to tie them together, as described.

HOWARD W. ROBINSON.